May 26, 1964  H. C. ABRAMS  3,134,276

DRILLING MACHINE

Filed March 2, 1961  7 Sheets—Sheet 1

INVENTOR.
HERBERT C. ABRAMS
BY
Barnes, Kisselle, Raisch & Choate
ATTORNEYS

May 26, 1964

H. C. ABRAMS 3,134,276

DRILLING MACHINE

Filed March 2, 1961

7 Sheets-Sheet 2

INVENTOR.
HERBERT C. ABRAMS
BY
Barnes, Kisselle,
Raisch & Choate
ATTORNEYS

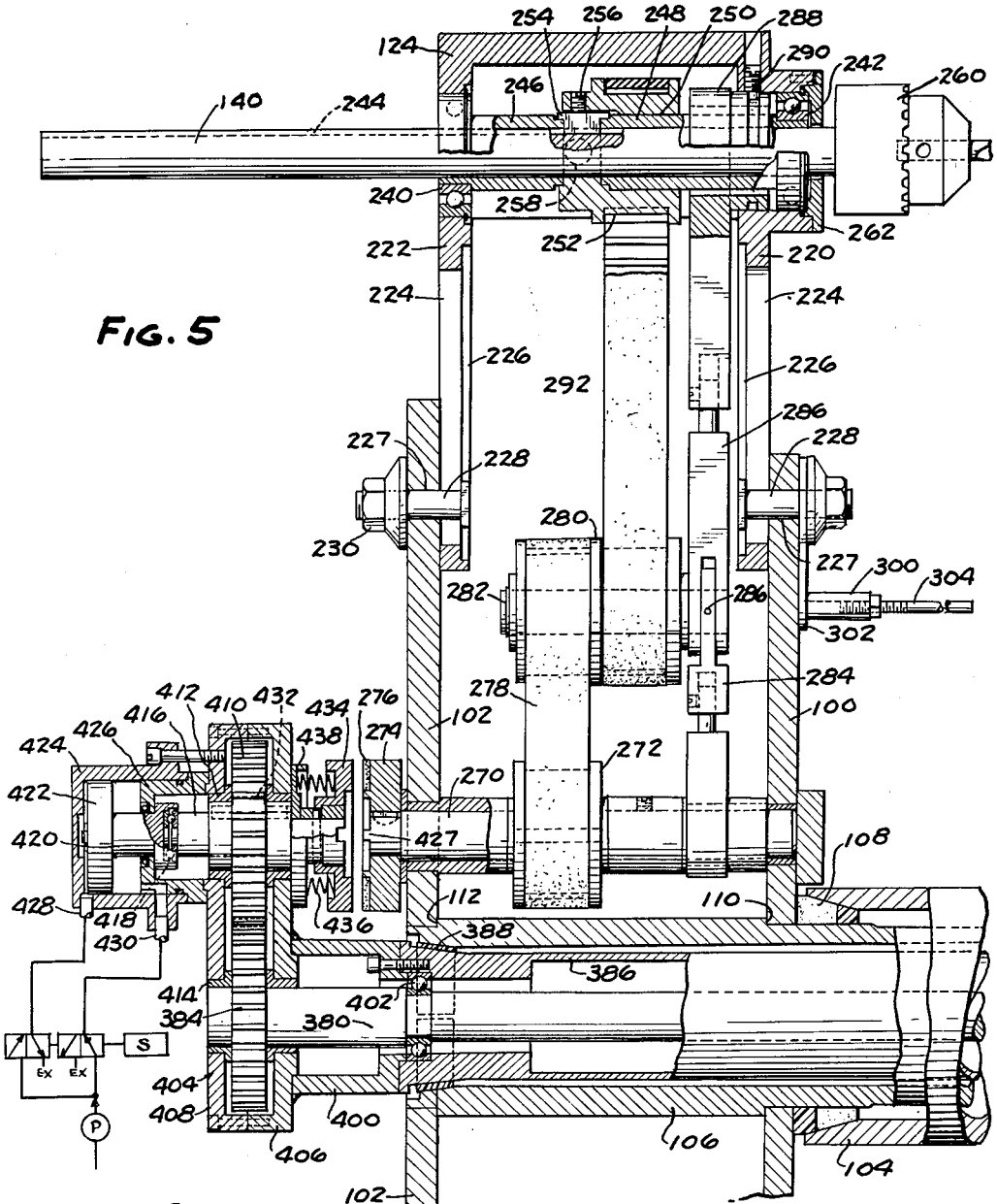

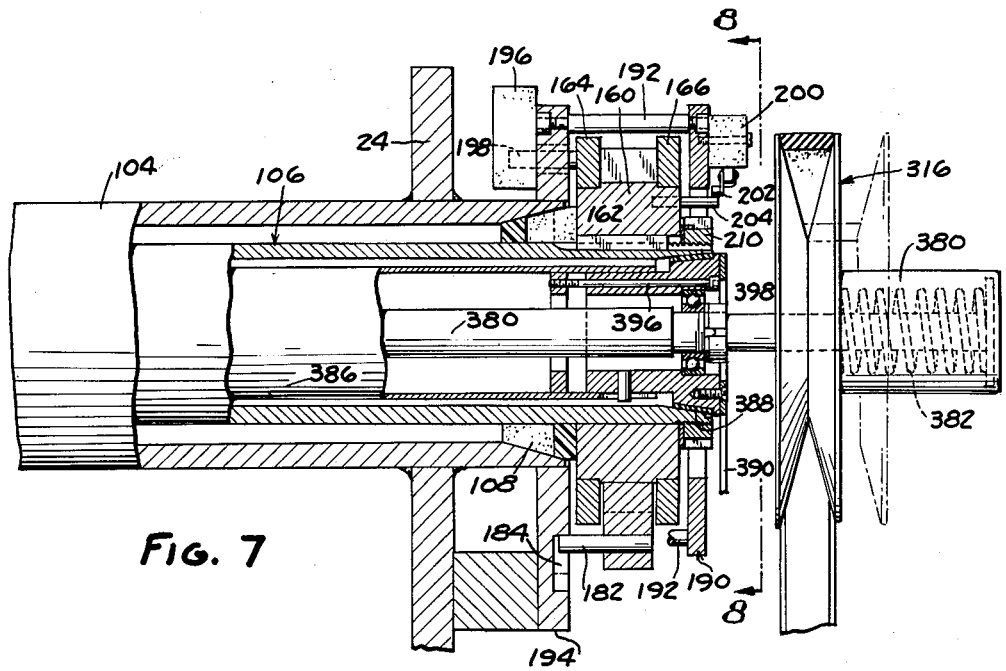
Fig. 7
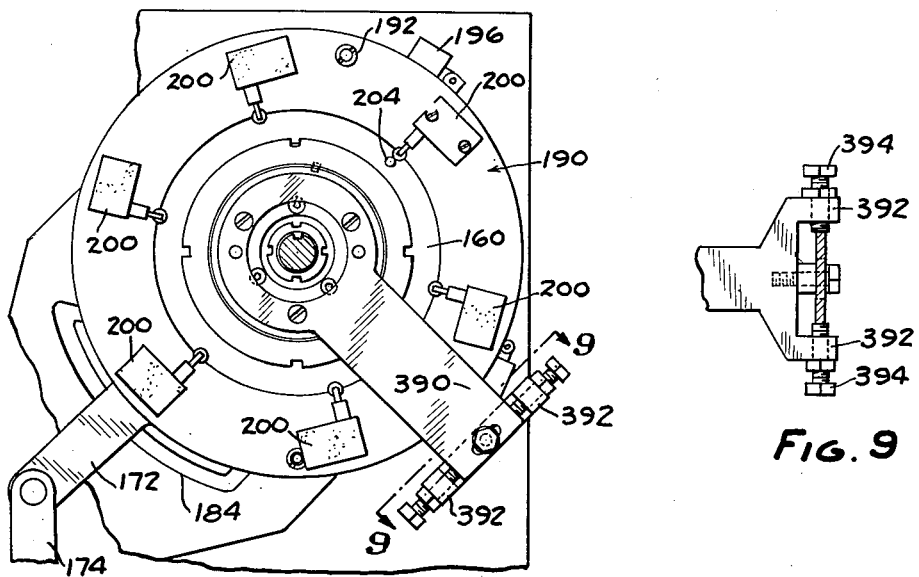
Fig. 8
Fig. 9
INVENTOR.
HERBERT C. ABRAMS
BY
Barnes, Kisselle, Raisch & Choate
ATTORNEYS

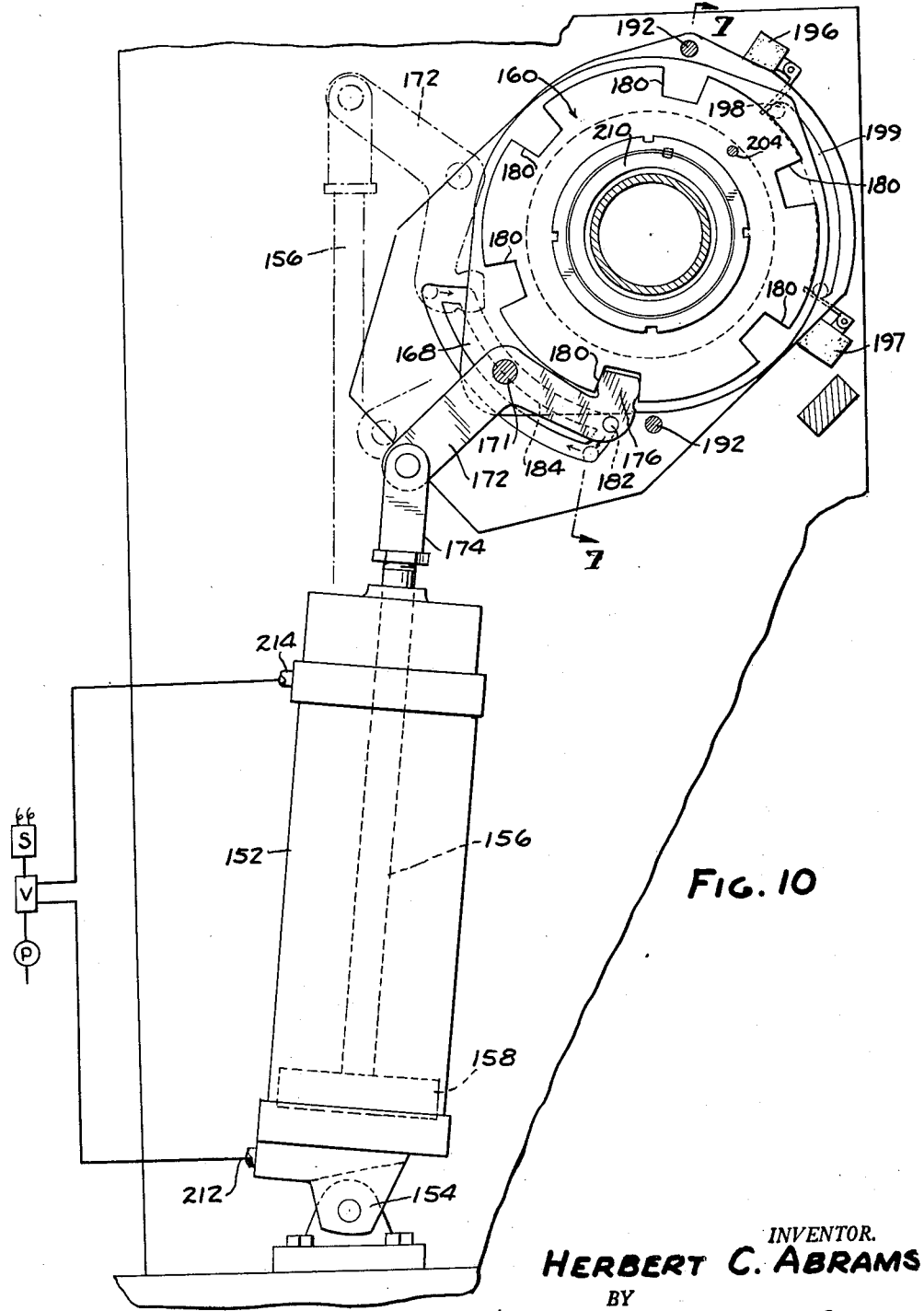

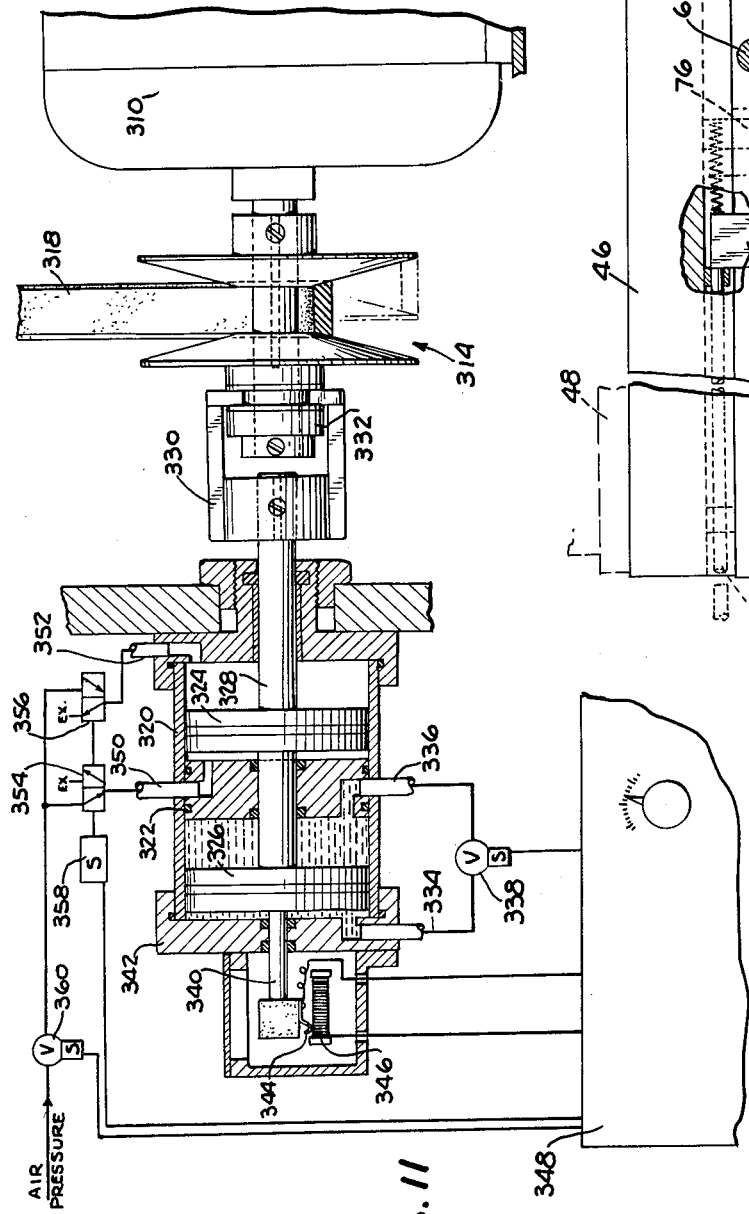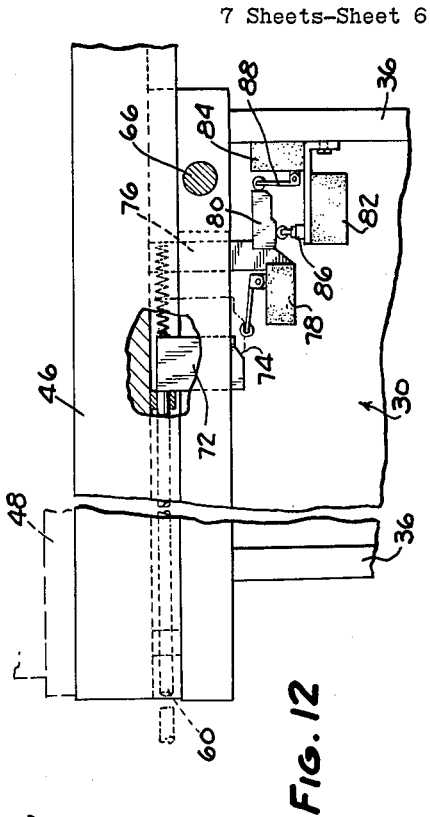

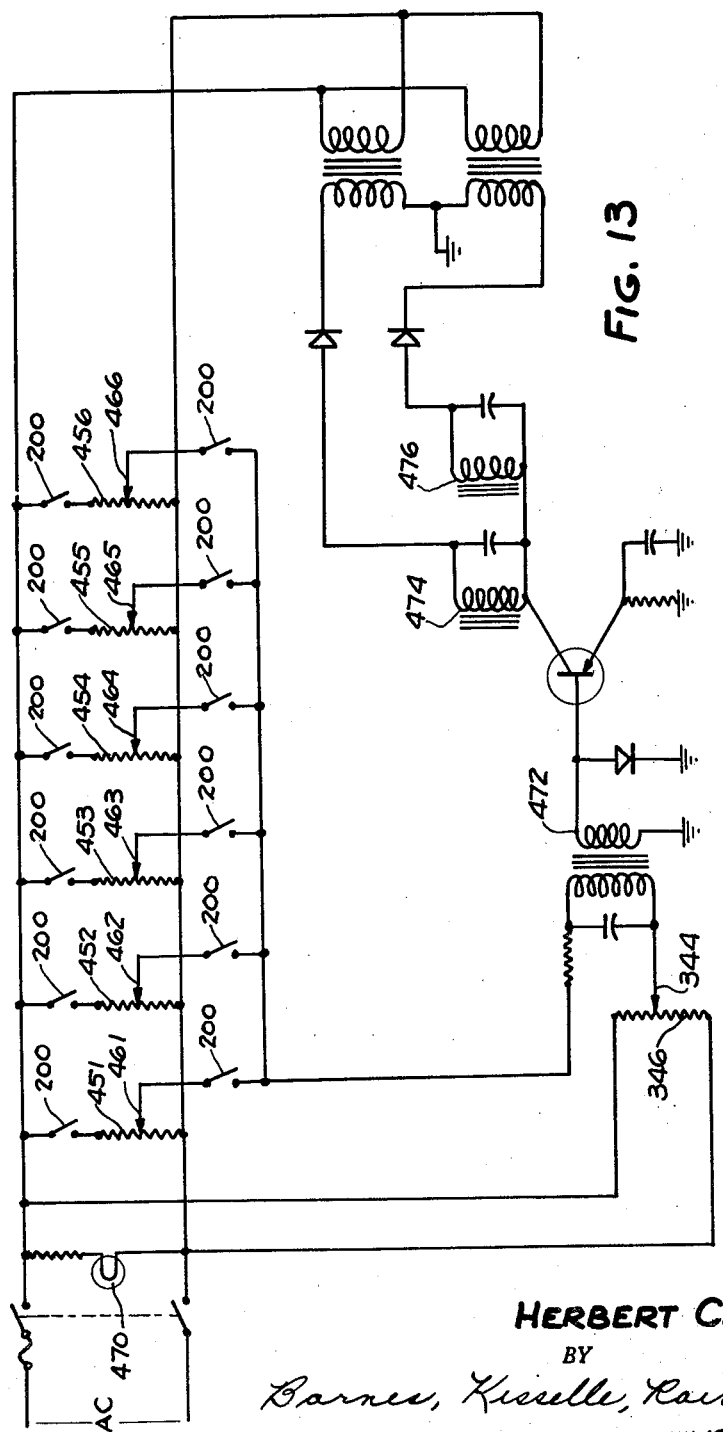

United States Patent Office 3,134,276
Patented May 26, 1964

3,134,276
DRILLING MACHINE
Herbert C. Abrams, 8909 Hubbell Ave., Detroit, Mich.
Filed Mar. 2, 1961, Ser. No. 92,829
4 Claims. (Cl. 77—24)

This invention relates to a machine tool for performing such operations as drilling, boring, tapping, reaming and counterboring on workpieces.

There are numerous drilling machines from an ordinary hand-operated drill press to a high production machine, such as Kingsbury's Multiple Spindle Machine. It is an object of the present invention to provide a relatively inexpensive drilling machine with automatic features which can be used by smaller shops which do not wish to invest in large and expensive automatic equipment.

It is an object of the invention to provide a machine which performs several different operations at the same or different centers or positions of a single workpiece which is held at a work station. A multiple workhead is provided which is indexed to that station so that each workhead can perform its particular function. It is an object to provide a bullhead or carrying wheel which has a number of operating units on it with rotating spindles movable to an infinite number of positions in a defined area at each unit. Each operating unit is enpowered as it reaches its work position where it can perform its function on the workpiece. In some cases, it may be desirable to index the workpiece at the work station so that work may be done on several sides of the piece.

It is an object of the invention to provide such a machine in which a mechanism indexes and then locks the multiple head in an accurate position independent of wear of the elements which actuate the indexing.

It is a further object to provide a device in which a single power source operates each workhead in turn as it reaches its work position. The device is especially adaptable to an independent speed control for each workhead at the work station.

It is a further object to provide a machine in which the drilling spindles are horizontal so that chips may fall freely away from the work part.

Other objects and features of the invention relating to details of construction and operation will be apparent in the following description and claims.

Figure 1:
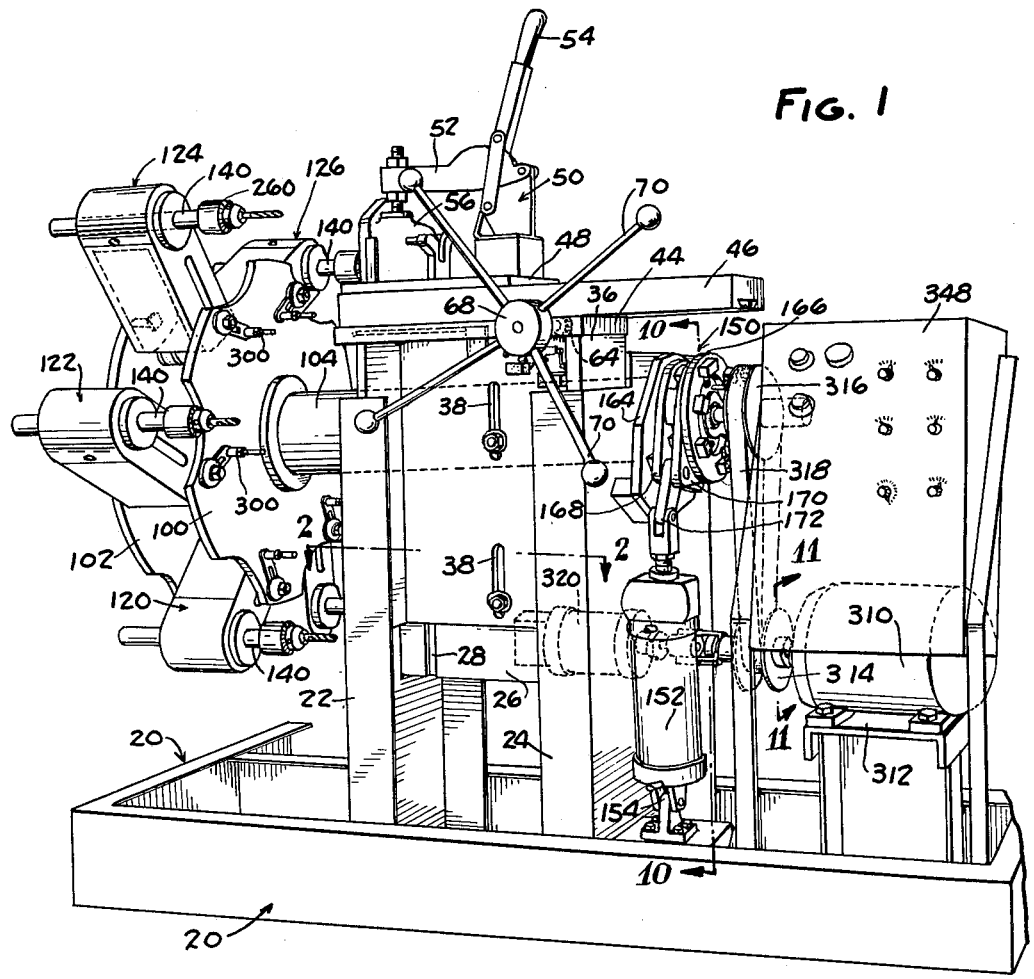

Drawings accompany the disclosure and the various views thereof may be briefly described as follows:

FIGURE 1, a perspective front elevation of the machine.

Figures 2, 3:
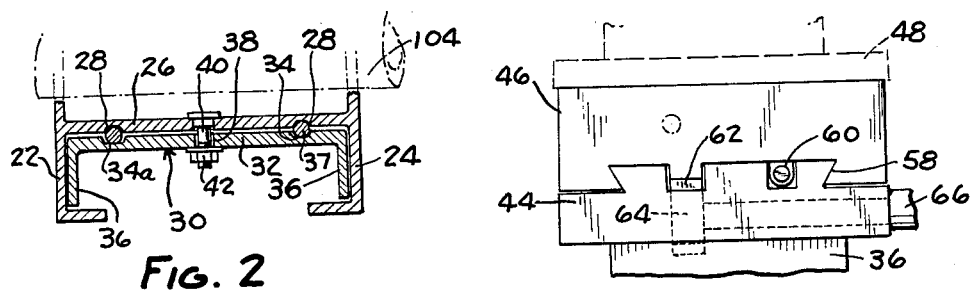

FIGURE 2, a sectional view of the vertical mounting slide on line 2—2 of FIGURE 1.

FIGURE 3, an end view of the horizontal work holder slide.

Figure 4:
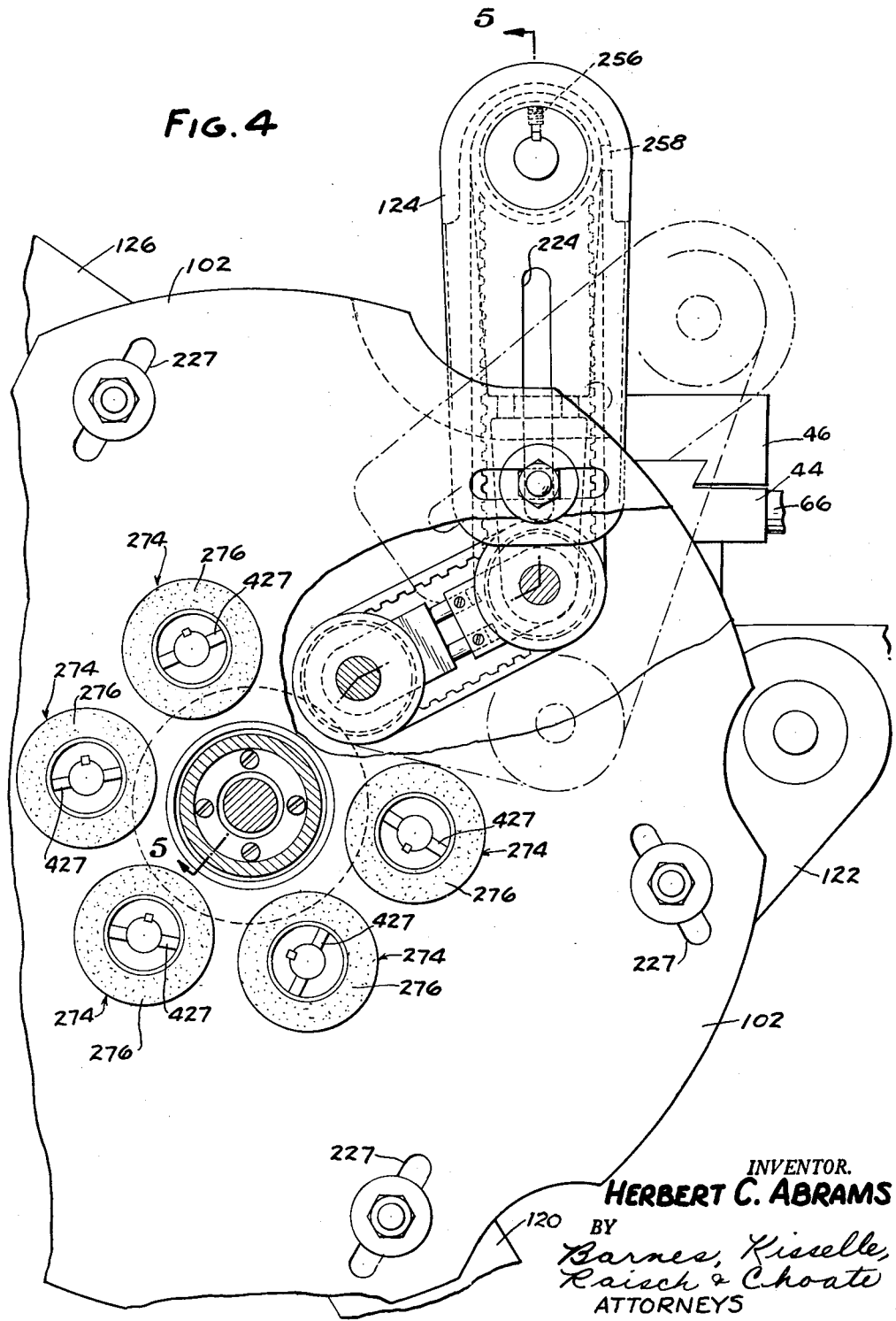

FIGURE 4, a front view of the index head showing a sectional view of the clutch.

FIGURE 5, a sectional view of the index head on line 5—5 of FIGURE 4.

FIGURE 6, a fragmentary view of a bearing detail.

FIGURE 7, a sectional view of the index mechanism showing the bearing adjustment means and taken on line 7—7 of FIGURE 10.

FIGURE 8, a sectional view of the index mechanism main shaft taken on line 8—8 of FIGURE 7.

FIGURE 9, a sectional view of an adjustment mechanism taken on line 9—9 of FIGURE 8.

FIGURE 10, a sectional view of the indexing mechanism taken on line 10—10 of FIGURE 1.

FIGURE 11, a sectional view of the tool speed control mechanism taken on line 11—11 of FIGURE 1.

FIGURE 12, a side view of the workholding table showing a reversing and indexing switch.

FIGURE 13, a circuit diagram of the speed control circuit for controlling the speed control cylinder.

Referring to the drawings:

In FIGURE 1 the base frame 20 provides a floor support and has vertical column risers 22 and 24 in parallel spaced relationship. These risers are in the form of channel members and have a connecting web 26 at the top portion thereof provided with guide grooves 28 (FIGURE 2). On one side of the web 26 there is mounted a slide channel 30 having a back portion 32 with grooves 34 facing the guide grooves 28 and side flanges 36 which track in the channels 22 and 24. Guide rods 37 ride in the grooves 28—34 to locate the parts relative to each other. One of the grooves 34 can be a wide groove. See left groove 34, FIGURE 2. The back plate 32 is slotted at 38 and locking shoulder bolts 40 in the web 26 extend through the slots 38. Nuts 42 lock the parts together in vertical adjustment utilizing suitable washers.

On the top of the channel 30 is a plate 44 which serves as a bottom slide for a work slide 46. On the work slide 46 is a work plate 48 which mounts a work clamp 50 having a clamping arm 52 with an actuating handle 54. Suitable fixtures are provided on the plate 48 to mount a workpiece 56. These fixtures can be arranged to index the workpiece on an axis as well as to mount it.

As shown in FIGURE 3, in an end view of the work slide, the plates 44 and 46 have a dovetailed engagement 58 and extending to the face of the slide 46 is a reversing switch actuator 60, the purpose of which will be later explained. On the bottom of the slide member 46 is a rack portion 62 which engages a gear 64 operated by a shaft 66. On the outer end of this shaft is a capston wheel 68 with operating arms 70.

In FIGURE 12, some of the controlling mechanism is illustrated which relates directly to the operation of the slide 46 and the supporting pillars. Mounted to move with the slide 46 is a pawl 72 having a lower cam surface 74. Spaced from the pawl 72 is a pawl 76 which carries a reversing switch 78 and a cam 80. Mounted in a fixed position on the pillars of the slide 30 is a two-stage switch 82 and a forward run switch 84. On the two-stage switch is a plunger 86 and on the speed-change switch is an actuating arm 88. The operation of these various switches in the cycle of the machine will be referred to at a later point in the specification. Switch 82 is a pulse switch which is provided to actuate a solenoid valve to cause the indexing operation to start. Switch 84 may be referred to as a forward run switch which prevents operation of the motor on restart until the slide is in full retraction to insure that the machine will always start in a forward motion. Switch 78 is a switch to cause spindle reversal in a tapping operation, for example.

It will be seen that the slide cam or pawl 72 is actuated by the long rod 60 previously referred to, the end of which is exposed at the face of slide 46 (see FIGURES 3, 12).

Referring again now to FIGURE 1, there is found at the left-hand side of the figure a multiple spindle head which can conveniently be called a bullwheel formed of double plates 100 and 102 supported by a large cylindrical horizontal column 104 wihch passes through the far side of the channels 22—24 and is supported by this column in a horizontal position on the back side of the web 26 as viewed in FIGURE 1.

The column 104 is seen also in FIGURES 5 and 7. As shown in FIGURE 5, the column supports a rotating tube 106 which is mounted in bearings 108 of slotted nylon at each end of the tube 104. The nylon is slotted from each side alternately as shown in FIGURE 6 and disposed around the rotating tube 106 in somewhat the manner of a spring collet. The plates 100 and 102 are mounted on the tube 106 and positioned by shoulders 110 and 112.

The tube 106 can be designated an indexing tube which shifts the entire bullwheel assembly mounted between plates 100—102 to various positions circumferentially around the machine.

As indicated in FIGURE 1, the bullwheel (plates 100—102) carries a plurality of spindle heads 120, 122, 124, 126 and so on, there being a total of six heads on the machine being illustrated. Each head carries a rotating spindle 140 for holding a work tool, such as a drill, a reamer or an end mill to perform work on the work piece which is located on the slide 46 and held by clamp 50.

The indexing mechanism for the tube 106 is shown generally in FIGURE 1 at 150 on the right-hand side of column 24 and actuated by a cylinder 152 pivotally mounted at 154 on the base of the unit and having a piston rod 156 (FIGURE 10) extending from an operating piston 158 within the cylinder.

As shown in FIGURES 7 and 10, a notched wheel 160 is keyed to the tube 106 by a key 162. Spaced on either side of the notched periphery of the wheel 160 are plates 164 and 166, each of which has a projecting lobe 168 and 170 between which is mounted, on a pin 171, a bell crank lever 172. One end of the lever 172 is connected to a link 174 on the end of piston rod 156 and the other end of the bell crank lever 172 has a dog tooth portion 176 which has a round shape intended to enter the notches 180 on the periphery of the wheel 160. The bell crank lever 172, which may be also referred to as a pawl, has a side projecting pin 182 riding in a guide groove 184. This groove 184 is somewhat in the shape of a curved parallelogram in that it has two parallel runs paralleling the periphery of the wheel 160 and two cross runs at each end. The inside run of this groove 184 prevents overtravel during the index cycle and thus controls the entire motion.

In the operation of the indexing device, it will be seen that, as viewed in FIGURE 10 with the piston 158 in the down position, the wheel 160 is locked in position. Upon raising of the piston 158 and the rod 156, the dog tooth 176 on the pawl is moved out of a notch on the pawl and pin 182 moves back to the outside run of groove 184. Ultimately, the force on the bell crank will move the lobes of the plates 164 and 166 in a clockwise direction to the dotted line position of FIGURE 10. A reversal of the stroke of the piston will first cause the bell crank lever 172 to rotate in a counter-clockwise direction so that it engages the next adjacent notch 180 and moves pin 182 to the inside run of groove 184. Then the entire mechanism, including the wheel 160 and the two plates 164 and 166, moves in a counter-clockwise direction until stopped by pin 198 at end of groove slot 199 at a new position of index. At the same time, this has moved the keyed tube 106 and the bullwheel plates 100 and 102. On the end of the tube 106 is mounted a switch plate 190 held by bolts 192 to a second plate 194 supported on the column 104. On plate 194 are stroke switches 196 and 197 operated by the pin 198 on the plate 164. On plate 190 are also a plurality of speed control switches 200, each having a roller arm 202 (FIGURE 8) which is to be contacted by an actuating pin 204 on wheel 160. Switch 196 is used to initiate engagement of a spindle clutch to be described and switch 197 can control a solenoid valve for air supply to cylinder 152.

In FIGURES 7 and 8, the switch pin 204 is shown on the side of the notched wheel 160 and the various speed selector switches 200 are shown circumferentially spaced around the switch plate 190. In each position of operation, then the speed selector switch 200 can be actuated for the purpose of operating the tools. Each switch 200 cuts in a preset potentiometer to control the position of an operating dual piston 324—328 described hereafter. The center of the switch plate 190 is open and projecting therethrough is the end of the tube 106 and a threaded mounting collar 210 notched on the periphery for the application of a wrench. The cylinder 152 is suitably associated with a fluid system connected to the respective ends of the cylinder through pipes 212 and 214 so that with an automatic control system the indexing can take place in response to any kind of an operator signal or a signal automatically imparted to the control system by motion of the machine parts.

Referring now to the particular indexing bullwheel which is composed of the two plates 100–102 carrying the heads 120, 122, etc. and the spindles 140, attention is directed to FIGURES 1, 4 and 5. In FIGURE 4, the elevation of plate 102 is shown with heads 120, 122, 124 and 126 shown in outline. Each head consists of an oval housing having slotted fore and aft walls 220 and 222 respectively, each having a longitudinal slot 224, with an enlarged groove 226 on the inner face of the side plates for receiving the head of a bolt 228 which passes respectively through the plates 100 and 102 with locking nuts 230 to clamp the bolts in place. The shank of the bolts 228 passes also through a slot 227 in the plates 100 and 102 so that there is a possibility of a number of locations for the bolt 228, both with respect to the mounting plates and also with respect to the side walls of the spindle heads.

As shown in FIGURE 4, the spindle head can be shifted to an infinite number of positions, two of which are shown, for example, in full lines and in dotted lines respectively. Mounted between the side walls 220 and 222 of each head is a spindle 140 supported in suitable bearings 240 and 242. Each spindle has a long keyway 244 and the spindle is further mounted in collars 246 and 248, there being a third collar 250 which has a timing belt groove 252. A key 254 in the pulley co-operates with the keyway of shaft 140, this key being locked in position by a set screw 256. The set screw 256 is mounted in a hub of the collar 250. A hole 258 in the side of the housing permits access of a screwdriver to reach the set screw 256. On the end of the spindle 140 is a suitable tool chuck 260 for holding a drill or an end mill or reamer or other rotary tool. A plate 262 confines the bearing 242. The spindles are easily removable or shiftable in the heads. In some cases where a chuck is unnecessary, a bar of round stock can be inserted as a spindle with a cutting tool mounted in its operating end. The screw 256 controls this entire adjustment or replacement.

Parallel with the shaft 140 (FIGURE 5) in the spindle housing, but located near the supporting tube 106, is a drive shaft 270 suitably supported in bearings in the walls 100 and 102 and carrying a timing belt pulley 272. On the end of the drive shaft 270 is a clutch plate 274 on the outside of disc 102, the clutch plate having a friction surface 276 to engage another clutch surface which will be later described. A timing belt 278 engages the tooth pulley 272 and also one side of a double timing belt pulley 280 which is mounted on a shaft 282. The double pulley 280 is mounted at the joint of a pair of extensible knee links 284 and 286, these links being joined by an interfitting pivot joint 285, the bottom link being mounted at shaft 270 for adjustable rotation, and the top link 286 being mounted on a collar 288 held in place by a screw 290 which engages a groove in the collar.

The second half of the pulley 280 is connected by a belt 292 to the pulley 250 previously described. Thus, a rotating drive through shaft 270 can be transmitted to the shaft 140 regardless of the position in which the spindle head is placed. The spindle of each head may thus be positioned in an infinite number of positions within a defined geometric area at each head location making it possible to perform a number of operations on a single workpiece either on a single center or at different locations on the piece.

Also, on the face of the plate 100 is an adjustable rod 300 which projects from the face of the plate 100 to serve as a mechanical stop or to contact the shaft 60 previously referred to as slidably mounted in the slide table 46. This contact of shaft 60 will cause a spindle reversal through reversing switch 78 to permit withdrawal of a tapping tool. The stop element 300 is mounted on a plate 302 supported by bolt 228 so that the actual stop pin 304 can be moved arcuately around the bolt 228 to be properly positioned relative to the shaft 60. It can thus serve as a stop or a reversing switch actuator.

As viewed in FIGURE 4, it will be seen that the clutch plates 274 on the respective shafts 270 are arranged in respective planetary positions around the center of plate 102. The drive for each clutch plate as its respective spindle reaches its work position originates at a motor 310 mounted on a stand 312 attached to the base 20 (FIGURE 1). This motor drives an expandable sheave 314 which drives a second expandable sheave 316 through a belt 318.

In FIGURE 11, the control for the expandable sheave 314 is illustrated. Mounted in the base of the machine is a cylinder 320 which is actually a double cylinder with a separator wall 322. A piston 324 is slidably mounted in the right-hand end and a piston 326 in the left-hand end, each mounted on a piston rod 328 which is a non-revolving shaft connected by a stationary trunnion 330 to the sheave shaft 332.

The left-hand cylinder cavity is filled with oil on each side of the piston 326 and these sides are connected through conduits 334 and 336 to a solenoid controlled valve 338, which when opened allows passage between the respective sides of the piston and when closed blocks motion of the piston. Motion of the pistons and the piston rod will cause a separation or a closing up of the sheave drive 314. It will be noticed that on the rear head end of the piston rod is a small projecting rod 340 passing through the cylinder head 342 to a sliding conductor 344 on a rheostat or bridge coil 346. This bridge coil is connected to a suitable bridge circuit in a control box 348, and the solenoid for valve 338 is also connected into this circuit.

The actuation of the pistons is accomplished by conduits 350 and 352 connected through valves 354 and 356 controlled by a solenoid 358. The valves 354 and 356 receive a fluid supply from a shut-off valve 360 which is also controlled by a solenoid electrically related to the control circuit. Each spindle on the bullwheel has a separate control which can be adjusted so that when a particular speed control switch 200 is actuated this individual rheostat is cut into the circuit and the piston 324 is moved to a point where the bridge circuit is balanced. Thus, the drive speed to be described can be altered for each particular drilling spindle as it reaches the work station.

The responding sheave 316 (FIGURE 7) is mounted on a shaft 380, this sheave being a spring-controlled assembly under the control of a spring 382 so that it will respond proportionately to the motion of the drive sheave 314. The shaft 380 extends through the supporting column at the center of the tube 106 to a gear 384 (FIGURE 5) on the end of the drive outside the column 106. The support for this shaft includes a clutch torque anchor tube 386 mounted for a stationary position within the index tube 106. Bearings 388 mount the anchor tube relative to the drive tube 106 and the tube is held against twisting by a plate 390 fastened to the right-hand end as viewed in FIGURE 7, this plate 390 being anchored on the frame as it extends radially outwardly from the tube assembly. This tube is anchored by a yoke member 392 with adjustable screws 394 at each end to permit the plate to be shifted circumferentially to adjust it to a proper position.

Within an anchoring collar 396 are suitable bearings 398 for mounting one end of the shaft 380, and at the other end of the torque sleeve 386 (FIGURE 5) is a mounting housing 400 which contains a bearing element 402 for the rotating shaft 380. Mounted on the housing 400 is a gear chamber 404 surrounding gear 384 and this gear chamber composed of plates 406 and 408 screwed together also houses a meshing gear 410 riding on a collar 412 which has shoulders to space the gear within the housing. Similar spacing rings 414 locate the gear 384. Slidable through the hub of the gear 410 is a rotating shaft 416 which has a thrust bearing 418 at one end interposed between the shaft and a piston rod 420 on which is mounted a piston 422 operable in a cylinder chamber 424 mounted around a support housing 426 adjacent the side plate 404. The other end of shaft 416 is diametrically slotted to receive a drive key 427 on clutch plate 274. Each end of the cylinder chamber 424 is connected by conduits 428 and 430 to a suitable fluid supply to actuate the piston to and fro in the cylinder.

A T-shaped key 432, shown in dotted lines in FIGURE 5, locks the gear 410 to the shaft 416. On the right-hand end of the shaft 416 is keyed a clutch plate 434. Springs 436 urge the clutch plate toward the right, these springs being anchored on one side of the clutch plate at one end and in a spring seat plate 438 at the other end.

It will be seen that pressure in the left-hand end of cylinder 424 will move the clutch plate 434 to contact with the clutch plate 274 previously described. Thus, a supply of air pressure in the control circuit can be controlled by a solenoid valve to engage the clutch or disengage the clutch. A shoulder engagement between the clutch plate 434 and the shaft retains the clutch plate on the shaft but provides a resilient axial drive force. As the piston 422 moves to the right (in FIGURE 5) the clutch plates 274 and 434 will meet and the friction between them will cause the appropriate shaft 270 and spindle 140 to rotate; as the parts get up to speed, the slot on shaft 416 will register with key 427 and further motion of piston 422 will cause direct engagement between shaft 416 and shaft 270 and thus a direct drive between them. As piston 422 overcomes the force of springs 436, the clutch friction is bringing the two shafts into synchronism for direct engagement.

In FIGURE 13, there is shown a circuit diagram for the control of the speed mechanism illustrated at FIGURE 12. The output bridge coil 346 is shown in the circuit and input bridge coils 451, 452, 453, 454, 455 and 456 are shown in the circuit with a suitable adjustable contact 461, 462, 463, 464, 465 and 466. Each of these input bridge coils is connected between a double switch 200 which has been previously described as actuated by the pin 204. The circuit is an alternating current bridge circuit which has a pilot light 470 and an output transformer 472. This circuit is associated with two relays 474 and 476 which are to control a solenoid circuit 358 previously referred to which in turn controls valves 354 and 356. While it is not essential to the understanding of the present invention, the circuit detects unbalance between any particular input bridge coil and the output bridge coil 346, and also detects the phase shift when the circuit is unbalanced. With the use of the diode circuit, this unbalance is reflected in the actuation of the relays 474 and 476 directing fluid ultimately to the piston 324 which sets the speed position of the expandable sheave 314. Thus, when any particular workhead is in position for operation at the work station, its speed control switch 200 will be actuated and closed placing the adjustable input bridge coil for that particular station into a circuit with the output bridge coil 346. This causes the proper positioning of piston 324 through the operation of the relays 474 and 476, and allows therefore the selection of an individual adjustable speed for every workhead.

Thus, as the bullwheel is indexed to its various positions, the clutch 434 is always in registry with one of the clutch plates 274 and in particular with the clutch plate which controls the tool head located at the work station.

It will thus be seen there has been described a machine with an adjustable vertical column with a horizontal slide 46 for mounting a workpiece and a means for shifting the slide with the work toward a work tool. Secondly, there has been described an indexing head carrying a multiplicity of adjustably positioned rotatable spindles with a power means for indexing the spindles and accurately locating the spindles at the end of the indexing operation. Thirdly, there has been described a variable speed control mechanism for operating a basic power drive member, namely, a clutch plate and direct drive so positioned that it can contact an individual clutch plate and drive shaft for any particular spindle in work position, such that engagement of the clutch will bring a working spindle up to speed and the direct drive will then engage. The work can be hand fed into the tool or if desired can be power fed into the tool. A suitable control circuit using standard electrical and fluid power units is used for the speed control, the indexing operation, and for a reversing operation when necessary for any particular spindle.

Thus, I have disclosed a relatively simple multiple spindle machine for performing a multiplicity of operations on a single workpiece in a semi-automatic production operation. A suitable coolant system, utilizing fluid or a spray, can be affixed to the machine.

I claim:

1. In a machine for performing a multiplicity of operations by a rotating tool on a single workpiece at a work station and having a plurality of tools positioned indexably relative to a workpiece, that improvement in a support for said tools which comprises a rotatable central support, a pair of supporting plates rigidly mounted on said rotatable central support in parallel spaced relation, a plurality of drive shafts rotatably mounted between said plates spaced circumferentially around said rotatable support, a plurality of elongate spindle housings mounted between said plates at the periphery thereof spaced circumferentially, means for mounting said spindle housings to be radially and oscillatably adjustable relative to the axis of said support, a tool spindle rotatably mounted in the outer end of each of said elongate spindle housings substantially parallel to the axis of said rotatable support, and power means connecting said drive shafts with said tool spindles wherein rotation of said drive shafts will cause rotation of said tool spindles regardless of the adjusted position of said spindle housings.

2. A machine as defined in claim 1 in which said power means comprises a pulley on each drive shaft, a pulley on each tool spindle, an intermediate spindle between said plates having a double pulley thereon, belt means associating said double pulley with said drive shaft, belt means associating said double pulley with said tool spindle, and means within said plates and said housing for maintaining the axial spacing between each of said pulleys regardless of the adjusted position of said tool spindle.

3. A machine as defined in claim 2 in which the means for maintaining said axial spacing comprises a first link pivotally mounted on the axis of a drive shaft at one end and pivotally mounted on the axis of an intermediate spindle at the other end, and a second link pivotally mounted on the axis of said intermediate spindle at one end and pivotally mounted on the axis of said tool spindle at the other end.

4. A machine as defined in claim 1 wherein said spindle housing has opposed walls slidable within and mounted respectively on said plates, bolt means transfixing said respective walls and respective plates, and a slot means in said walls and in said plates to receive said bolts, said bolts being releasably adapted to permit movement of said spindle housing relative to said plates from one position of adjustment to another.

References Cited in the file of this patent
UNITED STATES PATENTS

| | | |
|---|---|---|
| 561,346 | Schiefer | June 2, 1906 |
| 1,449,164 | Buhr | Mar. 20, 1923 |
| 1,953,876 | Burrell | Apr. 3, 1934 |
| 2,670,636 | Burg | Mar. 2, 1954 |
| 2,826,099 | Scholin et al. | Mar. 11, 1958 |
| 2,887,894 | Charlat | May 26, 1959 |
| 2,914,969 | Mitchell | Dec. 1, 1959 |
| 2,934,977 | Wildhaber | May 3, 1960 |
| 2,952,170 | Hansen et al. | Sept. 13, 1960 |

FOREIGN PATENTS

| | | |
|---|---|---|
| 396,131 | Great Britain | Aug. 3, 1933 |